United States Patent [19]
Degen

[11] Patent Number: 5,768,980
[45] Date of Patent: Jun. 23, 1998

[54] BAKING FORM ASSEMBLY

[76] Inventor: Monika Degen, 20 Golders Manor Drive, London, England, NW 11 9HT

[21] Appl. No.: 920,745

[22] Filed: Aug. 29, 1997

[51] Int. Cl.⁶ .............................. A47J 43/18; A47J 43/20
[52] U.S. Cl. .............................. 99/426; 99/353; 99/449; 99/450; 99/DIG. 15
[58] Field of Search .............................. 99/339, 340, 352, 99/353–355, 426–442, 449, 450; 249/132, 136, 142, 144, 119–122, DIG. 1

[56] References Cited

U.S. PATENT DOCUMENTS

| D. 325,684 | 4/1992 | Deare .......................................... D7/500 |
| 3,858,495 | 1/1975 | Gotwalt .................................. 99/449 X |
| 4,052,034 | 10/1977 | Marceno ............................. 249/DIG. 1 |
| 4,081,169 | 3/1978 | Lauter .......................................... 249/115 |
| 4,121,510 | 10/1978 | Frederick .................................... 99/425 |
| 4,345,516 | 8/1982 | Sinclair ........................................ 99/426 |
| 4,542,271 | 9/1985 | Tanonis et al. ...................... 99/DIG. 15 |
| 4,644,858 | 2/1987 | Liotto et al. ............................... 99/449 |
| 4,653,392 | 3/1987 | Gerger .................................. 249/142 X |
| 4,676,151 | 6/1987 | Gorsuch et al. ........................... 99/450 |
| 5,361,687 | 11/1994 | DeVries ..................................... 99/426 |
| 5,366,201 | 11/1994 | Diaz ........................................... 99/119 |
| 5,400,698 | 3/1995 | Savage .................................. 99/353 X |

*Primary Examiner*—Timothy F. Simone

[57] ABSTRACT

A new baking form assembly for forming a product pre-positioned on the standing rack before baking. In this way the need for the transfer of the product from the shape form to the standing rack after baking is negated. The inventive device includes a shape form which defines an enclosure for the forming of a product, characterized in that a standing rack is removably juxtaposed a bottom wall inside the shape form, the arrangement being such that on release of the product from the shape form the product is pre-positioned on the standing rack. In this way the need for the transfer of the product from the shape form to the standing rack is negated.

19 Claims, 2 Drawing Sheets

BAKING FORM ASSEMBLY

BACKGROUND OF THE INVENTION

1. Field of the Invention

This invention relates to moulds and shaping forms used in the baking or preparation of foodstuffs or other products. In particular this invention relates to a baking form used in the baking of cakes, flans, tarts, breads, and the like.

2. Description of the Prior Art

Baking forms such as tins and trays are used in the preparation of foodstuffs to define the shape of a product which is typically an amorphous lump or fluid mixture before baking. During baking the product rises or sets to occupy a shape defined by the confines of the tray. A common problem, particularly with delicate baked products, such as cakes or tarts, is the release of the product from the tray after baking, without damaging or spoiling the product.

This has been addressed in the past by use of the "loose bottom spring form referred to hereinafter as a spring form of the type described. This is a baking form, typically cylindrical in shape, with a detachable, circular base plate. The cylindrical walls of the form comprise a curved single strip of aluminum, which is urged into a cylindrical shape and held in the cylindrical configuration by a clamp, which locks opposite ends of the strip together.

A groove in the lower edge of the aluminum strip engages with the outside edge of the circular base plate so that the baking form provides a fluid-tight integral tray for the baking mix. Once the baking process is complete the sprung aluminum walls may be unclamped and released from the cake inside. The cake is then left on the base plate, from where it may be transferred to a cooling rack. If the cake is left too long on the base plate, it will go soggy due to condensation caused by the differential cooling rate arising from the contact of the cake with the base plate.

The transfer from the base plate to the cooling rack is an awkward process because it is easy to damage the cake as it is removed from the base plate, particularly since the baking process tends to cause the cake to adhere to the plate underneath. Typically a knife is used to release the cake, or the cake is inverted onto the cooling rack and the base plate removed from the top. Both of these processes are rather fiddly, and prone to mishandling which may be destructive to the cake or, in the case of release by knife, dangerous.

Known prior art moulds and shaping forms used in baking include U.S. Pat. No. 4,644,858; U.S. Pat. No. 4,121,510; U.S. Pat. No. 4,542,271; U.S. Pat. No. 3,858,495; U.S. Pat. No. Des. 325,684; and U.S. Pat. No. 4,676,151.

While these devices fulfill their respective, particular objectives and requirements, the aforementioned patents do not disclose a new baking form assembly. The inventive device includes a shape form which defines an enclosure for the forming of a product, characterized in that a standing rack is removably juxtaposed a bottom wall inside the shape form, the arrangement being such that on release of the product from the shape form the product is pre-positioned on the standing rack. Thus, the need for the transfer of the product from the shape form to the standing rack is negated.

In these respects, the baking form assembly according to the present invention substantially departs from the conventional concepts and designs of the prior art, and in so doing provides an apparatus primarily developed for the purpose of forming a product pre-positioned on the standing rack before baking. In this way the need for the transfer of the product from the shape form to the standing rack after baking is negated.

SUMMARY OF THE INVENTION

In view of the foregoing disadvantages inherent in the known types of baking forms now present in the prior art, the present invention provides a new baking form assembly construction wherein the same can be utilized for forming a product pre-positioned on the standing rack before baking. In this way the need for the transfer of the product from the shape form to the standing rack after baking is negated.

The general purpose of the present invention, which will be described subsequently in greater detail, is to provide a new baking form assembly apparatus and method which has many of the advantages of the baking forms mentioned heretofore and many novel features that result in a new baking form assembly which is not anticipated, rendered obvious, suggested, or even implied by any of the prior art baking forms, either alone or in any combination thereof.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new baking form assembly apparatus and method which has many of the advantages of the baking forms mentioned heretofore and many novel features that result in a new baking form assembly which is not anticipated, rendered obvious, suggested, or even implied by any of the prior art baking forms, either alone or in any combination thereof.

It is another object of the present invention to provide a new baking form assembly which may be easily and efficiently manufactured and marketed.

It is a further object of the present invention to provide a new baking form assembly which is of a durable and reliable construction.

An even further object of the present invention is to provide a new baking form assembly which is susceptible of a low cost of manufacture with regard to both materials and labor, and which accordingly is then susceptible of low prices of sale to the consuming public, thereby making such baking form assembly economically available to the buying public.

Still yet another object of the present invention is to provide a new baking form assembly which provides in the apparatuses and methods of the prior art some of the advantages thereof, while simultaneously overcoming some of the disadvantages normally associated therewith.

Still another object of the present invention is to provide a new baking form assembly for forming a product pre-positioned on the standing rack before baking. In this way the need for the transfer of the product from the shape form to the standing rack after baking is negated.

Yet another object of the present invention is to provide a new baking form assembly which includes a shape form which defines an enclosure for the forming of a product, characterized in that a standing rack is removably juxtaposed a bottom wall inside the shape form, the arrangement being such that on release of the product from the shape form the product is pre-positioned on the standing rack.

Still yet another object of the present invention is to provide a new baking form assembly that provides an improved method of releasing product from a form for cooling, drying or setting.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be made to the accompanying drawings and descriptive matter in which there are illustrated preferred embodiments of the invention. While it will be apparent that this invention has application in the production of cakes and the like, it will be evident that the invention will find further application in any process where a product is shaped or formed and must then be released from the former to stand on a rack for further processing including cooling or setting.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
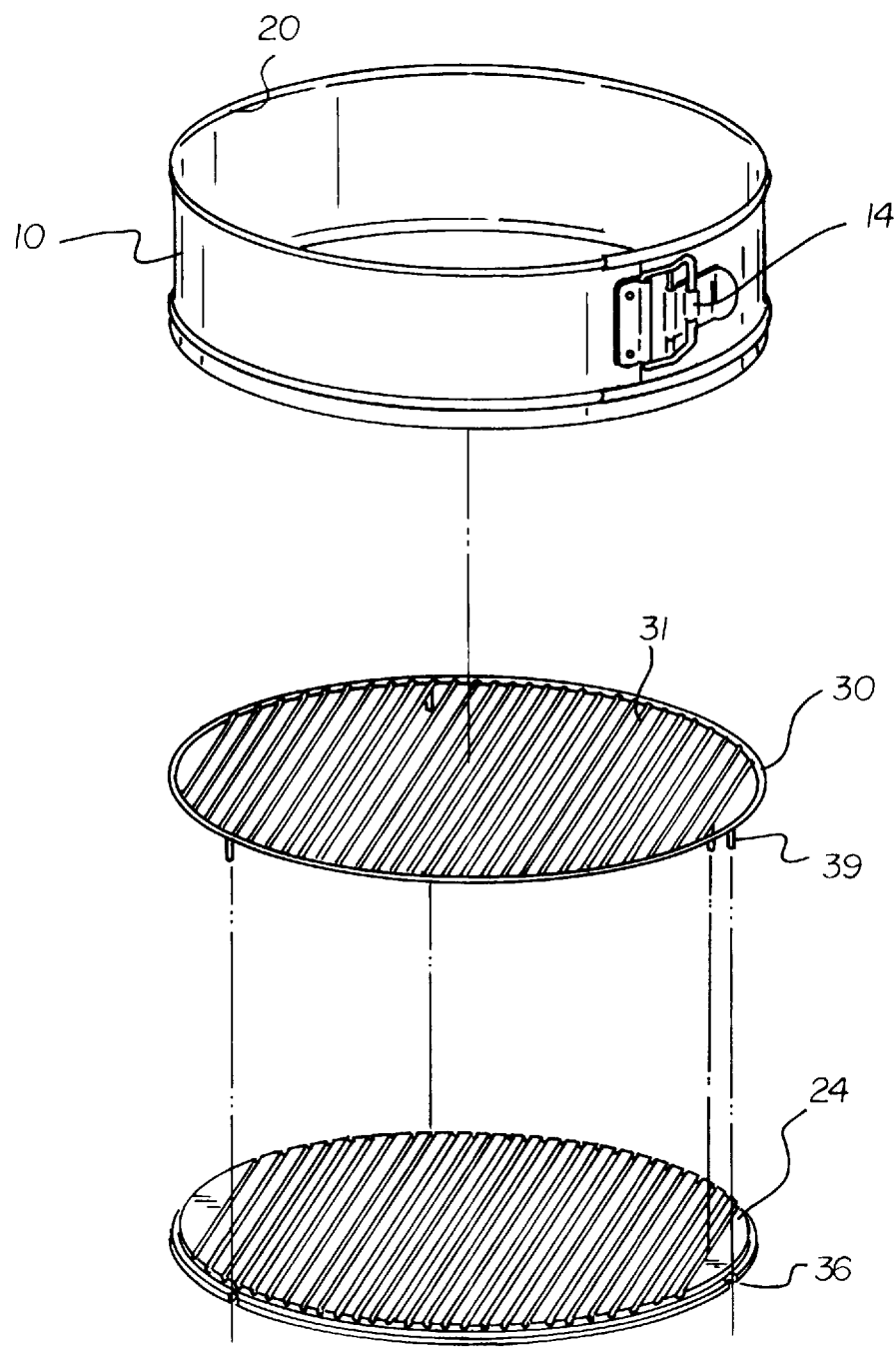
FIG. 1 is a perspective view of a new baking form according to the present invention in exploded format.
Figure 2:
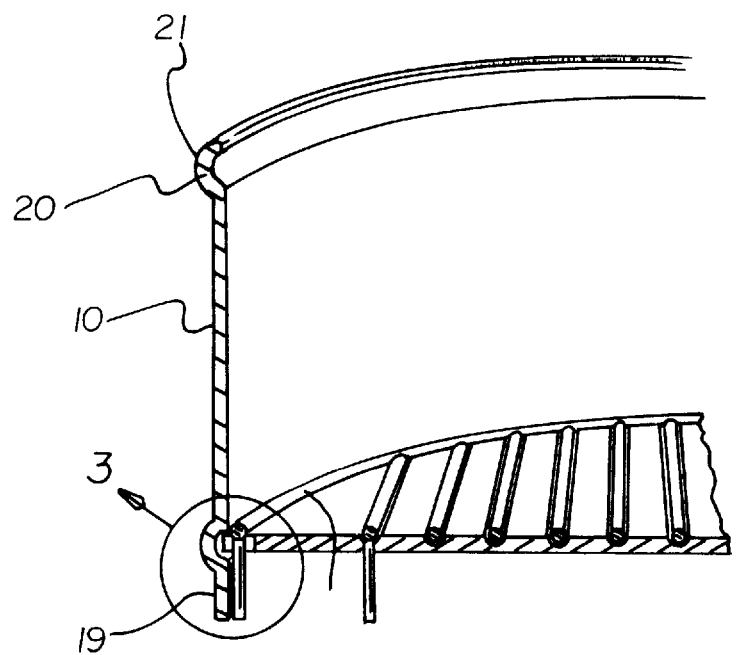
FIG. 2 is a cross sectional perspective view of a quarter section of the present invention.
Figure 3:
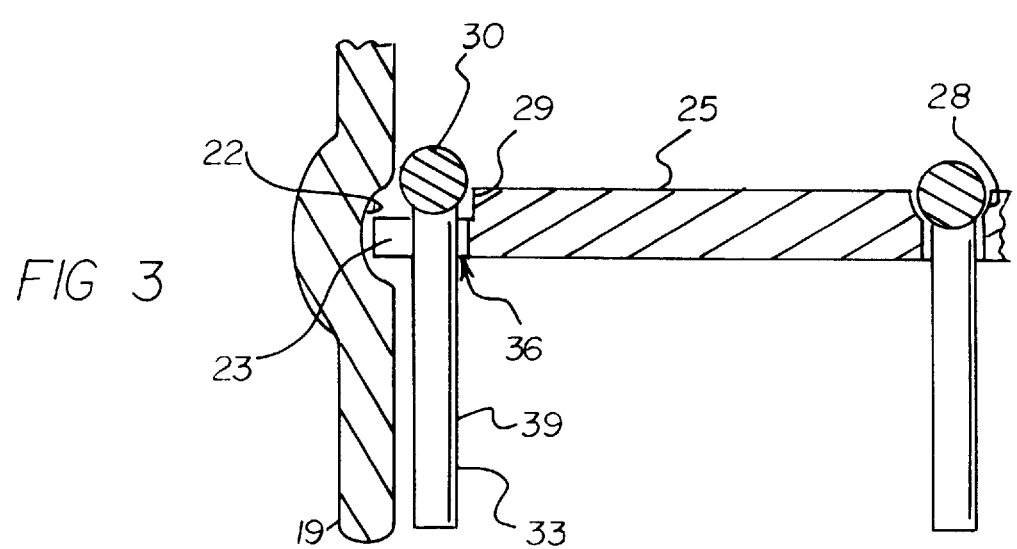
FIG. 3 is a sectional view of the present invention taken from Circle 3 on FIG. 2.

With reference now to the drawings, and in particular to FIGS. 1 through 3 thereof, a new baking form assembly embodying the principles and concepts of the present invention and generally designated by the reference numeral 1 will be described.

As best illustrated in FIGS. 1 through 3, the baking form assembly 1 comprises a shape form 2 which defines an enclosure for the forming of a product, characterized in that a standing rack 30 is removably juxtaposed to the bottom wall 24 inside the shape form 2, the arrangement being such that on release of the product from the shape form 2 the product is pre-positioned on the standing rack 30. In this way the need for the transfer of the product from the shape form 2 to the standing rack 30 is negated.

A baking form assembly 1 is shown generally in FIG. 1. The shape form 2 may be any suitable shape for the formation of a product. The variety of configurations and shapes will be known to the man skilled in the art. However, in one preferred embodiment of the present invention, the shape form 2 is a spring release form having a detachable base plate 24.

The shape form 2 has an upstanding side wall 10 and a bottom wall 24. The bottom wall 24 of the shape form 2 is preferably a releasable base plate 24. Release of the base plate 24 from the rest of the form allows the product and standing rack 30 to be easily removed from the mould.

In the preferred embodiment, the side wall 10 is circular in shape and comprises a resilient thin aluminum strip 11 which has a natural radius of curvature slightly greater than the radius of the cylindrical configuration which the strip 11 adopts in the baking form assembly 1. The strip 11 is thus held sprung under elastic tension. The elastic tension is maintained by means of a clamp 14. The clamp 14 acts to conjoin opposite ends 12, 13 of the strip 11. In a preferred embodiment, the clamp 14 may be riveted in place on the outside edge of 15 of one end 12 of the strip 11 and on the outside edge 16 of the other end of 13 of the strip 11.

Preferably, the base plate 24 has a top surface 25 which is crossed with a plurality of linear recesses 28 and is provided with a peripheral annular step 29. The grooves 28 and step 29 are configured to correspond to, and engage with, a generally circular standing rack 30 which comprises a stainless steel wire array of longitudinal braces or longerons 31 and a circular brace 32, as shown in FIGS. 1 and 3.

In another aspect of the invention the standing rack 30 is nestled into associated recesses 28, 29 in the base plate 24. This ensures that the standing rack 30 is held securely in position in the form during the forming of the product.

In addition, the recesses 28 may be configured such that the standing rack 30 and surrounding base plate 24 form a substantially coterminous, substantially uniform mutual base surface to the shape form 2. This prevents the standing rack 30 from becoming embedded in the product during the forming process which, in turn, facilitates the subsequent release of the product from the standing rack 30, and ensures that the bottom of the product has a smooth surface.

The side wall 10 has an upper edge 20 which is lipped to form a rounded trim 21 which strengthens and blunts the edge 20. The side wall 16 has a lower edge 19 in which is formed an annular recess 22 shown in FIG. 3. The annular recess 22 is adapted to engage the periphery 23 of a circular base plate 24.

The standing rack 30 may be any means suitable for the product to be cooled, set or otherwise processed after forming. The standing rack 30 must of course be able to withstand the forming process without itself being damaged or degraded, and without contaminating the product formed.

In one optional aspect of the invention, the rack 30 is a grid of wire mesh. This allows the base of the product to be exposed to the ambient atmosphere for cooling or setting. The wire is preferably made from a metallic material in the form of e.g. pressed aluminum sheet mesh or stainless steel wire.

In another aspect of the invention the standing rack 30 is provided with support means 39 adapted to support the standing rack 30 in spaced apart relation from whatever surface on which the rack is placed. This ensures that air may circulate under the standing rack to provide uniform cooling or evaporation from the product.

The support means 39 may be feet such as wire pins or pegs or other protrusions from the bottom surface of the standing rack 30. Ideally, the standing rack 30 is provided with three legs 33 which are adapted to pierce corresponding holes 36 in the base plate 24.

Where support means 39 in the form of protrusions such as legs 33, feet or pins are provided for the standing rack, these may be embedded in the base plate 24. Preferably, however, they protrude through the base plate 24 and stand proud of the bottom surface of base plate thereof. In this way, when the standing rack 30 and product are to be separated from the base plate 24, they may be placed on a surface and supported by the protrusions, and the base plate 24 may be pushed down from the standing rack 30 and product to leave the product on the standing rack 30 alone.

The use of a spring release form with a detachable base plate, combined with the incorporation of a standing rack according to the present invention considerably simplifies and increases the convenience of the process of releasing a moulded product providing means for it to stand and set or cool or otherwise be processed.

In use, the baking form assembly 1 is assembled by nestling the standing rack 30 into the top surface 25 of the base plate, clamping the side wall 10 into position around the base plate 24 so that the periphery 23 of the base plate is engaged with the lower annular recess 22 of the side wall. Product to be formed, such as a cake mix of flour, eggs, water, sugar, fruit etc. is poured into the enclosure formed by the baking form assembly 1.

The baking form assembly 1 is then placed, for example, in an oven for heating and cooked until it solidifies to form the cake. The baking form assembly 1 is removed from the oven and allowed to cool to the touch. The sprung side wall 10 is then released by unclamping the clamp, and put to one side. The base plate 24 and standing rack 30 are placed on the surface where the cake is cool, supported by the rack legs 33 which protrude from the bottom surface of the base plate. The base plate 24 may then be removed simply by pressing down the periphery 23 of the base plate so that it drops away to leave the underside of the cake free for cooling on the rack 30.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A baking form assembly for forming a product, comprising:
    a shape form having a bottom wall and a side wall, said shape form bottom wall and said shape form side wall defining an enclosure for the forming of a product;
    said shape form bottom wall comprising a releasable base plate; and
    a standing rack being removably juxtaposed with said shape form bottom wall.

2. The baking form assembly of claim 1, wherein said standing rack includes a grid mesh to permit exposure of the base of the product to the ambient atmosphere for cooling or setting.

3. The baking form assembly of claim 1, wherein said standing rack includes support means.

4. The baking form assembly of claim 3, wherein said standing rack has a bottom surface, and wherein said support means comprises a plurality of feet being extended from said bottom surface of said standing rack.

5. The baking form assembly of claim 4, wherein said feet of said standing rack are extended through said base plate.

6. The baking form assembly of claim 1, wherein said base plate has a plurality of recesses, said standing rack being nestled into said recesses to help securely hold said standing rack in position within the enclosure.

7. The baking form assembly of claim 6, wherein said recesses are arranged on said base plate such that said standing rack and said base plate form a substantially coterminous and substantially uniform mutual surface for said base wall of shape form.

8. The baking form assembly of claim 1, wherein said base plate is releasably attached to said side wall.

9. The baking form assembly of claim 1, wherein said base plate has a periphery, and wherein said side wall has an annular recess, said annular recess being adapted to accept said periphery of said base plate.

10. The baking form assembly of claim 9, wherein said side wall has an upper edge, and a lower edge, said annular recess of said side wall being located towards said lower edge of said side wall.

11. The baking form assembly of claim 9, further comprising a clamp, and wherein said side wall is formed by a strip having opposite ends, said clamp coupling said opposite ends of said strip together, said clamp permitting position of said strip between a released position and a sprung position, wherein said strip is attached to said base plate in a fixed position when in said sprung position, wherein said base plate being removable from said side wall when said side wall is in said released position.

12. The baking form assembly of claim 1, wherein said base plate has a periphery and a top surface, said base plate periphery having an annular step, said top surface having a plurality of spaced apart linear grooves, and wherein said standing rack has a brace frame and a plurality of spaced apart longerons, said standing rack being nestled into said top surface of said base plate, said peripheral annular step of said base plate being configured to engage said circular brace frame of said standing rack, said linear grooves of said top surface of said base plate being configured to engage with said longerons of said standing rack.

13. The baking form assembly of claim 12, wherein said standing rack has a bottom surface, and wherein a plurality of feet are extended from said bottom surface of said standing rack.

14. The baking form assembly of claim 13, wherein said base plate has a plurality of holes being extended therethrough, said feet being extended through said holes of said base plate.

15. The baking form assembly of claim 1, wherein said shape form is circular in shape.

16. The baking form assembly of claim 15, wherein said base plate is circular in shape.

17. The baking form assembly of claim 16, wherein said standing rack is generally circular in shape having a substantially circular brace frame, and a plurality of spaced apart longerons.

18. A baking form assembly, comprising:

a cylindrical shape form having a releasable circular base plate and a cylindrical side wall, said shape form defining an enclosure for the forming of a product;

said circular base plate having a periphery, a top surface, and a plurality of holes being extended therethrough, said periphery having an annular step, said top surface having a plurality of spaced apart linear grooves;

said cylindrical side wall being formed by an arcuate elongate strip having opposite ends, an upper edge, and a lower edge, said upper edge of said side wall being lipped to form a rounded trim;

a clamp coupling said opposite ends of said strip together, said clamp permitting position of said strip between a released position and a sprung position;

an annular recess being formed by said lower edge of said strip, said annular recess being adapted to accept said periphery of said base plate;

wherein said base plate and said side wall form a fluid tight integral tray when said strip is in said sprung position; and a generally circular standing rack having a bottom surface, a circular brace frame, a plurality of spaced apart longerons, and a plurality of feet, said standing rack being nestlable into said top surface of said base plate, said peripheral annular step of said base plate being configured to engage said circular brace frame of said standing rack, said linear groove of said top surface of said base plate being configured to engage with said longerons of said standing rack, said feet being extended from said bottom surface of said standing rack, said feet being extended through said holes of said base plate.

19. A baking form assembly for forming a product, comprising:

a shape form having a bottom wall and a side wall, said shape form bottom wall and said shape form side wall defining an enclosure for the forming of a product;

said shape form bottom wall comprising a releasable base plate; and a standing rack being removably juxtaposed with said shape form bottom wall, wherein said standing rack includes a grid mesh to permit exposure of the base of the product to the ambient atmosphere for cooling or setting.

wherein said standing rack includes support means;

wherein said standing rack has a bottom surface, and wherein said support means comprises a plurality of feet being extended from said bottom surface of said standing rack, wherein said feet of said standing rack are extended through said base plate.

* * * * *